(12) United States Patent
Gonzales et al.

(10) Patent No.: US 7,692,401 B2
(45) Date of Patent: Apr. 6, 2010

(54) HIGH VOLTAGE BATTERY PACK CYCLER FOR A VEHICLE

(75) Inventors: Philip Gonzales, Dearborn, MI (US); Bijal Patel, Northville, MI (US); Josephine Lee, Novi, MI (US); Majed Mohammed, LaSalle (CA)

(73) Assignee: Ford Motor Company, Dearborn, MI (US)

( * ) Notice: Subject to any disclaimer, the term of this patent is extended or adjusted under 35 U.S.C. 154(b) by 471 days.

(21) Appl. No.: 11/334,973

(22) Filed: Jan. 18, 2006

(65) Prior Publication Data

US 2006/0214637 A1 Sep. 28, 2006

Related U.S. Application Data

(60) Provisional application No. 60/664,260, filed on Mar. 22, 2005.

(51) Int. Cl.
H02J 7/14 (2006.01)

(52) U.S. Cl. .................. 320/104; 320/130; 324/426; 324/432

(58) Field of Classification Search .............. 320/104, 320/130; 307/9.1, 10.1; 324/426, 432
See application file for complete search history.

(56) References Cited

U.S. PATENT DOCUMENTS

| | | | | |
|---|---|---|---|---|
| 4,419,588 A | * | 12/1983 | Goiset | 307/9.1 |
| 5,202,617 A | * | 4/1993 | Nor | 320/130 |
| 5,578,915 A | | 11/1996 | Crouch, Jr. et al. | |
| 5,594,318 A | * | 1/1997 | Nor et al. | 320/108 |
| 5,650,710 A | * | 7/1997 | Hotta | 320/128 |
| 5,659,240 A | | 8/1997 | King | |
| 5,777,456 A | | 7/1998 | Kern | |
| 5,952,813 A | * | 9/1999 | Ochiai | 320/104 |
| 6,114,833 A | | 9/2000 | Langston et al. | |
| 6,791,295 B1 | * | 9/2004 | Berels | 320/103 |
| 6,842,707 B2 | | 1/2005 | Raichle et al. | |
| 7,246,015 B2 | * | 7/2007 | Bertness et al. | 702/63 |
| 2001/0038274 A1 | * | 11/2001 | Peter | 320/104 |
| 2002/0140397 A1 | * | 10/2002 | Hasegawa et al. | 320/104 |
| 2003/0015995 A1 | * | 1/2003 | Tamura et al. | 320/162 |
| 2003/0029654 A1 | * | 2/2003 | Shimane et al. | 180/65.4 |
| 2003/0132730 A1 | * | 7/2003 | Ochiai | 320/104 |
| 2003/0210014 A1 | * | 11/2003 | Jabaji et al. | 320/104 |
| 2004/0044448 A1 | * | 3/2004 | Ramaswamy et al. | 701/22 |
| 2004/0130288 A1 | | 7/2004 | Souther et al. | |
| 2004/0164705 A1 | * | 8/2004 | Taniguchi | 320/104 |
| 2004/0169489 A1 | * | 9/2004 | Hobbs | 320/104 |
| 2004/0239288 A1 | * | 12/2004 | Harrison et al. | 320/104 |
| 2004/0251870 A1 | * | 12/2004 | Ueda et al. | 320/104 |
| 2005/0040789 A1 | | 2/2005 | Salasoo et al. | |

(Continued)

Primary Examiner—Edwawrds Tso
Assistant Examiner—Arun Williams
(74) Attorney, Agent, or Firm—Tung & Associates

(57) ABSTRACT

An off-board battery cycler is used to condition an on-board battery system used in electric or hybrid electric vehicles. The battery cycler periodically discharges the vehicle's high voltage traction battery to eliminate battery "memory" that can prevent the battery from being fully charged. The cycler also recharges both the high voltage battery and an on-board low voltage battery used to power the vehicle's electrical system. High voltage AC power used in recharging the high voltage battery is switched using contactors physically isolated within the battery cycler, in order to protect operating personnel from coming onto contact with high voltage. Faults and malfunctions are recorded by the vehicle's on-board controller

16 Claims, 1 Drawing Sheet

U.S. PATENT DOCUMENTS

2005/0052185 A1  3/2005  Moore
2005/0151509 A1* 7/2005  Cook ........................ 320/116
2005/0248313 A1* 11/2005 Thorland .................... 320/130
2006/0049797 A1*  3/2006 Hope et al. ................. 320/104

* cited by examiner

HIGH VOLTAGE BATTERY PACK CYCLER FOR A VEHICLE

CROSS-REFERENCES TO RELATED APPLICATIONS

This application claims the benefit of priority from Provisional Application No. 60/664,260 filed Mar. 22, 2005, the full disclosure of which is incorporated herein by reference.

FIELD OF THE INVENTION

This invention generally relates to battery systems for electric and hybrid electric vehicles, and deals more particularly with an off-board battery cycler for periodically discharging the vehicle's high voltage traction battery, and for recharging both the traction battery and a low voltage battery used to power the vehicle's electrical system.

BACKGROUND OF THE INVENTION

Electric and hybrid-electric powered vehicles employ a high voltage battery pack to power electric motors that drive the vehicle. These high voltage batteries, sometimes referred to as traction batteries, must be periodically recharged. During periods of nonuse, the vehicle is connected to a source of AC power, such as 110 volt AC. A battery charger located either on-board or off-board the vehicle, converts the 110 volt AC to DC which is used to recharge the traction battery to a desired state of charge.

During normal operation of the vehicle, on-board systems periodically determine the state of charge of the high voltage battery, and in the case of a hybrid electric vehicle, onboard control systems switch from battery power to an alternative power source, such as a fuel cell or IC engine when the state of charge falls below a threshold value. The ability of the high voltage battery pack to hold a full electrical charge is reduced by so called battery "memory." Battery memory is common in deep discharge batteries which are repeatedly partially discharged and recharged. The memory effect prevents drawing a full charge from a completely charged battery, and also prevents accurate state of charge calculations from being performed on-board the vehicle since a calculated state of charge of a battery suffering from memory infect does not accurately reflect the amount of charge that can be drawn from the battery.

In addition to the high voltage battery pack, the vehicles mentioned above employ a low voltage on-board battery, typically 12 volts, to power the low voltage electrical system on the vehicle. These low voltage batteries, sometimes referred to as SLI batteries (starting, lighting and ignition) must be periodically charged using a battery charger separate from the high voltage battery pack charger. Thus, two battery chargers are normally employed to recharge the on-board battery systems.

Accordingly, there is a need in the art for an improved system for charging both the high voltage and low voltage batteries on vehicles which overcomes the problems discussed above. The present invention is intended to satisfy this need.

SUMMARY OF THE INVENTION

According to one aspect of the invention, apparatus is provided for controlling the charge on a battery system for a vehicle, wherein the battery system includes a first low voltage battery for operating electrical systems on the vehicle, and a second, high voltage traction battery. The apparatus comprises a battery cycler for charging both the low voltage battery and the high voltage battery, and a controller for controlling the operation of the battery cycler. The battery cycler is also operable for periodically discharging the high voltage battery to eliminate battery memory, and the controller is operable for controlling the battery cycler to achieve a pre-selected state of charge on the high voltage battery. The battery cycler preferably uses a constant current source for delivering constant charging current to the high voltage battery during a recharging cycle. The battery cycler is located off-board the vehicle and includes releasable electrical connections for connecting the battery cycler with the high voltage battery and the controller which is located on-board the vehicle. Faults or other malfunctions in the battery cycler are recorded by the vehicle's on-board controller.

According to another aspect of the invention, a battery charge control system for vehicles comprises a battery cycler for discharging and recharging a high voltage traction battery, a first controller for controlling the operation of the battery cycler, and a second controller for sensing faults in the operation of the battery cycler and the first controller. The cycler includes an AC contactor for coupling a source of alternating current with a load formed by the traction battery. The AC contactor is physically isolated within the cycler to prevent exposure of operating personal to the high voltages used for recharging the battery. The cycler includes a high voltage section coupled with an AC power source for supplying constant current to the high voltage battery, and a low voltage section that supplies low voltage for recharging a low voltage battery.

According to a further aspect of the invention, a system is provided for controlling the state of charge of an onboard battery system for a vehicle, wherein the battery system includes a low voltage battery for operating electrical systems on the vehicle and a high voltage traction battery. The system comprises an off-board battery cycler for discharging and recharging the high voltage battery, and for charging the low voltage battery, and an onboard controller for controlling the operation of the battery cycler to achieving a pre-selected state of charge on each of the high and low voltage batteries. The battery cycler includes a low voltage section for charging the low voltage battery, and a high voltage section for periodically discharging and recharging the high voltage battery. The high voltage section includes a physically isolated switch for switching a source of high voltage AC into a circuit with a load that includes the high voltage battery. The high voltage section includes a constant current source used to recharge the high voltage battery. The cycler has a load bank used in discharging the high voltage battery. Faults or other malfunctions in the battery cycler are recorded by the vehicle's onboard controller.

One of the advantages of the invention resides in the use of a single, off-board battery cycler unit to recharge both the high voltage battery and the low voltage battery. Operating personal are protected from exposure to high voltages during the recharging process as a result of the AC contactors being contained within the cycler unit, thus physically isolating the high voltage circuits from operating personal. The battery cycler eliminates battery memory by periodically discharging the high voltage battery and recharging it using a constant current source.

These non-limiting features, as well as other advantages of the present invention may be better understood by considering the following details of a description of a preferred embodiment of the present invention. In the course of this description, reference will frequently be made to the attached drawings.

DETAILED DESCRIPTION OF THE PREFERRED EMBODIMENT

Figure 1:
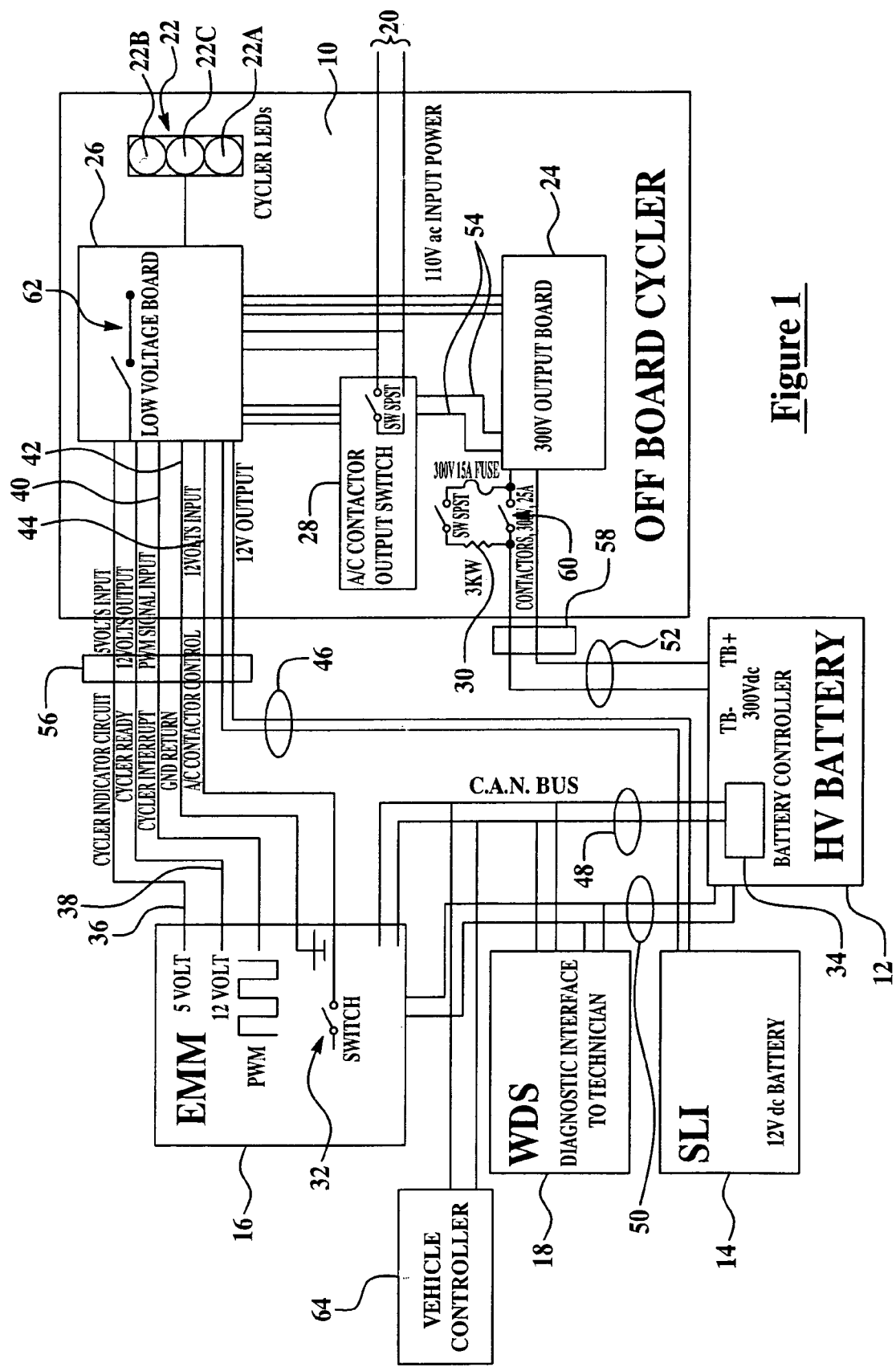
FIG. 1 is a combined block and schematic diagram of a battery cycler in accordance with the preferred embodiment of the invention, shown connected to certain on-board vehicle systems.

Referring to FIG. 1, the present invention relates to a system for controlling the charge on storage batteries supplying power to an electric or hybrid electric powered vehicle. These batteries include a high voltage battery or battery pack 12, and a low voltage battery 14, both of which are located onboard the vehicle. The high voltage battery 12 provides DC current to one or more electric motors (not shown) which drive the vehicle's wheels, and is this sometimes referred to as the traction battery. The high voltage battery 12 includes a battery controller 34, the details of which will be discussed later. The low voltage battery 14 is typically a 12 volt DC battery used power electrical systems and accessories on the vehicle, and is sometimes referred to as the SLI battery (starting, lighting and ignition). The high voltage battery 12 typically operates, for example, at between 250 and 300 volts, DC.

The charge control system of the present invention functions to charge and condition both the high voltage battery 12 and the low voltage battery 14. The charge control system broadly comprises a battery cycler 10 which is located off-board the vehicle, and a controller in the form of an energy management module (EMM) 16 carried on-board the vehicle. The battery cycler 10 includes a low voltage section comprising a low voltage circuit board 26, and a high voltage section comprising a high voltage circuit board 24, AC contactor output switch 28 and a pair of contactor switches 60. The high voltage section include the pair of high voltage output lines 52 which are releasably connected to the high voltage battery 12 by means of a releasable, quick disconnect electrical connector 58.

The battery cycler 10 is powered by a 110 volt AC power which is delivered from a conventional AC power source via feed lines 20 to the contactor output switch 28 which is a single pole single throw 110 volt switch. The AC contactor output switch 28 is coupled by lines 54 to the high voltage circuit board 24 which includes a contactor coil (not shown) that functions to control the contactor switches 60. When the output switch 28 is closed, the contactor coil is energized, causing the contactors 60 to close, thereby providing constant charging current to the high voltage battery 12. However, when the contactor switch 28 remains open a signal produced by the low voltage board 26 will also energize the contactor coil, causing contactors 60 to close. With contactors 60 closed, the high voltage battery 12 is discharged through a load bank 30, which may comprise a commercially available, air cooled load bank.

The low voltage board 26 receives 110 volt power from lines 20 which is stepped down to 5 and 12 volt signals used to control a variety of functions, as well as to charge the low voltage battery 14 via lines 46. The low voltage board also controls the operation of the contactor output switch 28 as well as the contactor coil forming part of the high voltage board 24. The low voltage board 26 includes a momentary push button switch 62 whose operation will be described later. The low voltage section of the battery cycler 10 is connected through a series of lead lines 36-46 to the EMM 16 and battery 14 using a quick disconnect electrical connector 56.

The low voltage board 26 controls a series of LED display status lights 22, comprising green, amber and red LEDs 22a, 22b, and 22c, respectively. The LED display 22 provides the operator with a visual indication of the operating status of the battery cycler 10. When the push button switch 62 is initially depressed, the green LED 22a illuminates, indicating that the cycler 10 has been turned on. Illumination of the amber LED 22b indicates that the battery cycler 10 is either in the charge or discharge mode. Illumination of the red LED 22c indicates that a fault or other malfunction has occurred within the battery cycler 10. Periodic flashing of the red LED 22c indicates that there is a fault or malfunction on-board the vehicle.

A CAN (controller area network) bus 48 on-board the vehicle allows information exchange between the EMM 16, battery controller 34, an on-board vehicle controller 64 and an off-board diagnostic interface 18 which may comprise, for example, the World Diagnostic System developed by Ford Motor Company for use with OBD2 equipped vehicles. The WDS 18 may comprise, for example, a laptop computer which can be plugged into an interface that connects a computer to a CAN bus 48. The diagnostic interface 18 is also directly connected via lines 50 to the EMM 16 and high voltage battery 12. Information concerning the health of the battery conditioning system is monitored by the vehicle controller 64 which is also connected to the CAN bus 48. Faults or malfunctions in the battery cycler 10 are recorded and date stamped by the vehicle controller 64 and these faults may be accessed and diagnosed by the diagnostic interface 18.

The EMM 16 monitors the charge state of batteries 12 and 14 and controls the operation of the battery cycler 10. In operation, the user connects the battery cycler 10 to the vehicle using the quick disconnect electrical connectors 56 and 58. The user then depresses the push button 62, causing a 5 volt signal to be delivered from the low voltage board 26 on line 36 to the EMM 16 where it is interpreted as a request to begin conditioning of batteries 12, 14. EMM 16 is responsive to this request signal to assess the current state of charge of batteries 12, 14 as well as determine the interval of time that has elapsed since the high voltage battery 12 was last fully discharged to eliminate battery memory. Depending upon the results of this assessment, EMM 16 sends a control signal on line 40 to the battery cycler 10 instructing it to take certain action based on the charge assessment. This control signal is a PWM (pulse width modulated) 12 volt signal whose duty cycle determines the function to be performed by the cycler 10. For example, in one embodiment, a 50% duty cycle is interpreted by the battery cycler 10 as an instruction to begin charging the high voltage battery 12.

The EMM 16 monitors the charge on the batteries 12, 14 and when the high voltage battery 12 is fully charged, the EMM 16 issues an 80% duty cycle signal to the cycler 10 that the charge is complete. A 30% duty cycle signal issued by the EMM 16 is interpreted by the battery cycler 10 as an instruction to switch to a standby mode. A signal with yet a different duty cycle, e.g. 20%, is issued to the battery cycler 10 in order to instruct it to begin discharging the high voltage battery 12. When the battery cycler 10 receives a signal from the EMM 16 indicating that a charging sequence should be initiated, a signal is delivered from the low voltage board 26 to the contactor switch 28, causing the latter to close which in turn energizes contactor coil. Powering up contactor coil closes contactors 60, thereby connecting the high voltage battery 12 with constant charging current which may comprise a charge, for example, of 288 volts DC at 4.5 amps. Charging is continued until the state of charge of the high voltage battery 12 is 100%.

When the high voltage battery 12 is charged to 100%, the low voltage circuit 26 causes the contactor switch 28 to open, thereby de-energizing the contactor coil which opens contactors 60 and removes power from the battery 12. However, in the event that the contactor switch 28 does not open as commanded, the EMM 16 closes an internal switch 32 which results in a 12 volt signal being delivered via line 44 to the low voltage circuit 26 which responds by causing the contactor switch 28 to open, in an override fashion.

The battery controller 34 performs a number of functions related to assessing and controlling the state of charge on the battery 12. The battery controller 34 determines whether the battery 12 needs to be charged to reverse deactivation caused by prolonged duration of idle time at low state of charge. The battery controller 34 also determines if the battery 12 needs to be refreshed in order to reverse memory effect or whether the battery 12 needs to be rebalanced. Finally, the battery controller 34 determines whether the battery 12 needs the state of charge to be reset.

A variety of possible faults in the battery cycler 10 may be detected and logged by the vehicle controller. Examples of these faults include failure to charge the high voltage or low voltage buses, failure to communicate with the vehicle, failure to stop charging either the low or high voltage buses, and failures in the operation of the indicator light 22.

It is to be understood that the system, which has been described is merely illustrative of one application of the principles of the invention. Numerous modifications may be made to the device of the method as described without departing from the true spirit and scope of the invention.

What is claimed is:

1. Apparatus for controlling the charge on a battery system for a vehicle, the battery system including a first, low voltage battery for operating electrical systems on the vehicle and a second, high voltage traction battery, comprising:
    a battery cycler adapted to charge both the low voltage battery and the high voltage battery, said battery cycler further adapted to discharge the high voltage battery, said battery cycler off-board said vehicle; and,
    a controller adapted to control the operation of the battery cycler including discharge of said high voltage battery, said controller on-board said vehicle.

2. The apparatus of claim 1, wherein:
    the battery cycler is further operable for periodically discharging the high voltage battery, and the controller is operable for controlling the battery cycler to achieve a preselected state of charge on the high voltage battery.

3. The apparatus of claim 1, wherein the battery cycler includes:
    a constant current source for delivering constant charging current to the high voltage battery during charging of the high voltage battery, and a switching circuit operated by the controller for coupling the constant current source with the high voltage battery.

4. The apparatus of claim 1, wherein the battery cycler includes:
    a first releasable connection for connecting the battery cycler with the high voltage battery, and a second releasable connection for connecting the battery cycler with the controller.

5. The apparatus of claim 1, wherein the battery cycler includes a manual switch operable by a user for initiating the operation of the battery cycler.

6. The apparatus of claim 1, wherein the controller senses the state of charge of the high voltage battery and delivers a signal to the battery cycler causing the cycler to recharge the high voltage battery when the state of charge falls below a preselected level.

7. The apparatus of claim 1, wherein:
    the controller periodically delivers a first, discharge control signal to the battery cycler causing the battery cycler to discharge the high voltage battery to at least a first preselected state of charge, and the controller delivers a second recharge control signal to the battery cycler following discharge of the high voltage battery, the recharge control signal causing the battery cycler to recharge the high voltage battery to at least a second preselected state of charge greater than the first state of charge.

8. The apparatus of claim 1, wherein the battery cycler includes a physically isolated electrical contactor for selectively coupling the high voltage battery in a circuit supplying high voltage power to the high voltage battery.

9. The apparatus of claim 1, further comprising a second controller adapted to sense faults in the operation of the battery cycler and the controller, said second controller on-board said vehicle.

10. The apparatus of claim 1, wherein said vehicle is a hybrid vehicle.

11. A system for controlling the state of charge of an on-board battery system for a vehicle, wherein the battery system includes a low voltage battery for operating electrical systems on the vehicle and a high voltage traction battery, comprising:
    a battery cycler adapted to discharge and recharge the high voltage battery, and adapted to recharge the low voltage battery, said battery cycler off-board said vehicle; and,
    a first controller adapted to control the operation of the battery cycler including discharge of said high voltage battery to achieve a preselected state of charge on each of the high and low voltage batteries, said first controller onboard said vehicle;
    a second controller adapted to sense faults in the operation of the battery cycler and the first controller, said second controller on-board said vehicle.

12. The system of claim 11, wherein the battery cycler includes:
    a low voltage section for recharging the low voltage battery, and, a high voltage section for periodically discharging and recharging the high voltage battery, the high voltage section including a physically isolated switch for switching a source of high voltage AC into a circuit with a load that includes the high voltage battery.

13. The system of claim 12, wherein the battery cycler includes a first electrical connector for releasably coupling the high voltage section with a high voltage power source, and a second electrical connector for releasably coupling the battery cycler with the first controller.

14. The system of claim 12, wherein the switch is controlled by the first controller.

15. The system of claim 12, wherein the high voltage section includes a constant current source used to recharge the high voltage battery.

16. The system of claim 11, wherein the battery cycler includes a load bank for use in discharging the high voltage battery.

* * * * *